United States Patent Office 3,376,313
Patented Apr. 2, 1968

3,376,313
PROCESS OF PREPARING ORGANIC
DISULFIDES FROM THIOLS
Thomas J. Wallace, Elizabeth, N.J., assignor to Esso Research and Engineering Company, a corporation of Delaware
No Drawing. Filed Nov. 15, 1963, Ser. No. 323,897
19 Claims. (Cl. 260—327)

ABSTRACT OF THE DISCLOSURE

Organic sulfides are prepared by reacting an organic thiol with an organic compound containing the (S=O) moiety, the mole ratio of thiol to S=O containing compound being about 1:1 when it is desired to form cyclic disulfides and about 2:1 when it is desired to form acyclic disulfides. The organic disulfides produced are useful as additives in cosmetic products and depilatory creams.

---

This invention is directed to a novel process of preparing organic disulfides which comprises contacting an organic thiol with an organic compound containing the (S=O) moiety. The reactions contemplated herein are usually conducted in essentially inert atmospheres and preferably in the absence of extraneous oxygen.

According to a preferred embodiment of this invention, the organic thiol and the organic (S=O) containing compounds are reacted in the presence of an organic amine, preferably a primary, secondary or tertiary aliphatic amine having from 4 to 12 carbon atoms. The use of an amine catalyst, especially $C_4$ to $C_{12}$ aliphatic amines, lowers the temperature of reaction, increases the yield of and selectivity to the disulfide, and greatly increases the rate of reaction anywhere from approximately 80 to approximately 250-fold, and even higher. Acid catalysts, e.g., acetic acid and other organic acids also have a catalytic effect, but much less than that of the aliphatic amines.

The temperatures of reaction can range from room temperature or even below up to about 140° C. and even higher.

Usually when preparing aromatic disulfides in accordance with this invention, the reaction temperatures range from about room temperature to about 60° C., and from about 90° to 150° C. when preparing aliphatic disulfides. When amine catalysts are employed, reaction temperatures usually range from about 40° to 70° C. for preparing aliphatic disulfides from aliphatic thiols. The reactions are conducted at atmospheric pressure in closed system reactor vessels so that the pressures developed during reaction are the autogenous reaction pressures caused by the reactants, themselves.

The preparation of organic disulfides according to this invention can be performed at acid, neutral or basic pH with or without solvents, which can be either organic or inorganic. Of course, when a solvent is employed, an inert solvent should be used, viz., one which does not interfere with the oxidation of thiols to disulfides. Examples of suitable inert solvents are toluene, xylene, cetane, dimethylformamide, sulfur dioxide, etc. Usually the disulfide synthesis is conducted at a pH ranging from about 4 to 14. The employment of an aliphatic amine catalyst usually results in a basic pH during reaction.

Both linear and cyclic disulfides can be prepared in accordance with the process of this invention. The present invention is based upon the discovery that organic compounds containing the (S=O) moiety selectively oxidize organic thiols (organic mercaptans) to their corresponding disulfides. The specific organic disulfide produced is independent of the (S=O) containing organic compound which is employed. The organic radicals of the (S=O) containing organic compound do not become part of the disulfide produced in the reaction. Therefore, a wide variety of organic compounds containing an (S=O) moiety can be used. Suitable exemplary classes of (S=O) containing organic compounds which can be employed include, but are not limited to, the following: organic sulfoxides; organic sulfones; organic disulfoxides; organic sulfinates; organic thiosulfinates; etc. The following (S=O) containing organic compounds can be listed as exemplary of those suitable for use in accordance with this invention: phenyl methyl sulfoxide; tetramethylene sulfoxide; dimethyl sulfoxide; diethyl sulfoxide; di-n-propyl sulfoxide; cyclohexyl methyl sulfoxide; di-iso-propyl sulfoxide; di-n-butyl sulfoxide; benzyl methyl sulfoxide; dibenzyl sulfoxide; phenyl methyl sulfone; dibenzyl sulfone; tetramethylene sulfone; dimethyl sulfone; diethyl sulfone; di-n-propyl sulfone; di-iso-propyl sulfone; di-n-butyl sulfone; cyclohexyl methyl sulfone; dimethyl disulfoxide; diethyl disulfoxide; dimethyl sulfinate; diethyl sulfinate; methyl ethyl sulfinate; dimethyl thiosulfinate; diethyl thiosulfinate; methyl ethyl thiosulfinate; etc.

It has been discovered that while any organic (S=O) containing compound, especially any of the classes of compounds listed hereinabove, can be used to selectively oxidize the organic thiols to their corresponding organic disulfides, all such (S=O) containing organic compounds are not equally effective in this regard. Preferably, an organic (S=O) containing compound is employed which has two organic groups joined to the same sulfur atom which is doubly bonded to an oxygen atom, viz., the organic sulfoxides and sulfones. Of the organic sulfoxides and sulfones, it has been discovered that those having both of the organic substituents as aliphatic substituents yield the best results in preferentially oxidizing the organic thiols to their corresponding disulfides. The order of ascending selectivity of the organic sulfoxides and sulfones in terms of their comparative ability to preferentially oxidize organic thiols to their corresponding disulfides is as follows: diaryl, alkyl-aryl, diaralkyl and dialkyl, with dialkyl sulfoxides and sulfones being the most selective and diaryl sulfoxides and sulfones being the least selective on a comparative basis.

Consequently, insofar as obtaining selective oxidation of the organic thiols to their corresponding organic disulfides is concerned, the preferred organic sulfoxides are those having the formula:

wherein R is selected from the group consisting of alkyl, aralkyl and alkaryl.

Suitable preferred organic sulfoxides and sulfones which can be listed as exemplary of those included by the above formula: dimethyl sulfoxide; diethyl sulfoxide; tetramethylene sulfoxide; cyclohexyl methyl sulfoxide; dibenzyl sulfoxide; benzyl methyl sulfoxide; diisopropyl sulfoxide; di-n-butyl sulfoxide; dimethyl sulfone; tetramethylene sulfone; cyclohexyl methyl sulfone; dibenzyl sulfone; etc.

When it is desired to form linear (acyclic) disulfides, organic monothiols are reacted with a suitable (S=O) organic compound, e.g., an organic sulfoxide, employing approximately a 2:1 mole ratio of organic monothiol to organic sulfoxide. The reaction stoichiometry is shown in Equation 1 below:

Equation 1

In essence the organic monothiol is oxidized to the corresponding organic disulfide, and the organic sulfoxide is reduced to the corresponding monosulfide with the elimination of water. Of course, a mixed organic disulfide can be prepared readily by employing a mixture of organic monothiols, but the mole ratio of organic thiol to organic (S=O) containing compound is still maintained at 2:1. The production of a mixed organic disulfide, viz., one having different organic R groups is illustrated in Equation 2 below.

Equation 2

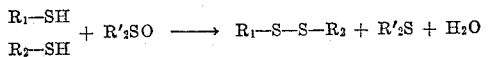

As noted from Equation 2, the mixed disulfide produced has two different organic groups, $R_1$ and $R_2$.

Moreover, the organic (S=O) containing compound can have a plurality of different organic radicals. For example, a mixed organic sulfoxide can be used to oxidize either a single organic monothiol, a mixture of organic monothiols or an organic dithiol. Equation 3 below illustrates the products obtained by reaction of a mixed organic sulfoxide with a mixture of different organic monothiols.

Equation 3

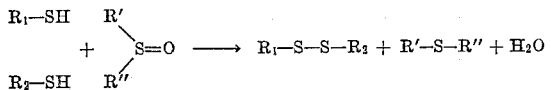

When the present invention is employed to produce cyclic disulfides, an organic dithiol is reacted with an (S=O) containing organic compound, e.g., an organic sulfoxide, employing approximately a 1:1 mole ratio of dithiol to sulfoxide. Equation 4 below, stoichiometrically illustrates the preparation of a cyclic disulfide in accordance with this invention.

Equation 4

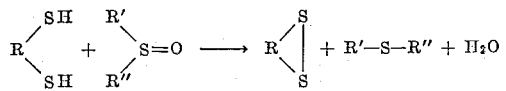

Accordingly, from the foregoing it can be seen that, in one embodiment, the present invention has provided a process for preparing organic disulfides which comprises reacting at least one organic monothiol with an organic sulfoxide at a temperature of from about 25° C. to about 150° C. and a pH of from about 4 to 14, the mole ratio of monothiol to sulfoxide being about 2:1.

In another embodiment, the present invention has provided a process for preparing organic disulfides which comprises contacting at least one organic monothiol with an organic sulfoxide and a catalytic amount of an organic amine at a temperature of from about 25° C. to about 150° C. and a pH of from about 4 to 14, the mole ratio of monothiol to sulfoxide being about 2:1.

In a further embodiment, the present invention has provided a process for preparing acyclic organic disulfides which comprises contacting at least one organic monothiol with an organic sulfoxide and a catalytic amount of an organic amine at a temperature of from about 25° C. to about 150° C. and a pH of from about 4 to 14, the mole ratio of monothiol to sulfoxide being about 2:1.

In still another embodiment, the present invention has provided a process for preparing cyclic organic disulfides which comprises reacting an organic dithiol with an organic sulfoxide at a temperature of from about 25° C. to about 150° C. and a pH of about 4 to 14, the mole ratio of said dithiol to sulfoxide being about 1:1.

In yet another embodiment, the present invention has provided a process for preparing cyclic organic disulfides which comprises contacting an organic dithiol with an organic sulfoxide and a catalytic amount of an organic amine at a temperature of from about 25° C. to about 150° C. and a pH of from about 4 to 14, the mole ratio of said dithiol to sulfoxide being about 1:1.

It has been discovered that the preparation of organic disulfides in accordance with this invention is general both insofar as the organic thiol and the organic (S=O) compounds are concerned. Thus, in the preparation of acyclic organic disulfides in accordance with this invention, the organic monothiol can be alkyl or mixed alkyl; aryl or mixed aryl; alkaryl or mixed alkaryl; aralkyl or mixed aralkyl; alkylaryl; alkyl-alkaryl; alkyl-aralkyl; arylalkaryl; aryl-aralkyl; and alkaryl-alkyl.

Suitable organic dithiols which can be employed in the practice of this invention to produce cyclic organic disulfides by (S=O) selective oxidation include those in the following exemplary classes of organic dithiols: alkyl dithiols; esp. $C_2$ to $C_8$ alkyl dithiols; alkyl trithiols; aryl dithiols; alkaryl dithiols and aralkyl dithiols wherein the alkyl moiety has at least two carbon atoms. Of course, in cases where the alkyl moiety has more than two carbon atoms, e.g., three or four carbon atoms or more, a trithiol, tetrathiol, etc. can be used in place of the dithiol. Further, it is also clear that polymeric dithiols can be oxidized by this technique provided that a suitable molar ratio of sulfoxide to thiol group is employed, viz., one (S=O) group per two (SH) groups.

The alkyl groups of the organic thiols can be substituted or unsubstituted $C_1$ to $C_{40}$ aliphatic alkyls, especially $C_1$ to $C_{18}$ aliphatic alkyls. The aryl group (or groups) of the organic thiols can be substituted or unsubstituted, homo or heterocyclic rings containing at least one benzene ring with monocyclic or polycyclic, especially mono- and di-benzene rings containing, aryl groups. The alkaryl and aralkyl groups of the organic thiols can be substituted or unsubstituted groups having combinations of the alkyl and aryl groups set forth hereinabove.

The following organic thiols can be listed as exemplary organic thiols for use in accordance with this invention: 1-hexadecanethiol; 1-dodecanethiol; 1-octadecanethiol; α-toluenethiol; 4-methyl - benzenethiol; 2 - napthalenethiol; benzenethiol; 2 - methylbenzenethiol; 1,4 - butanedithiol; 1,3-propanedithiol; 1,2 - ethanedithiol; 1,8 - octanedithiol; 2 - dodecanethiol; 4 - hexadecanethiol; cyclohexanethiol; 1,1-di-n-butyl - 1 - butanethiol; 2 - pyridinethiol; 2 - thiophenethiol; diphenylmethanethol; α,α-orthoxylenedithiol.

The organic thiol can be a substituted organic thiol. Suitable substituents which can be present on the organic thiol include: amino groups; hydroxyl groups; carboxyl groups; halogens, e.g., chloro, bromo, iodo and fluoro; sulfur groups; nitro groups; acetamido groups; amido groups; acyl groups; etc. Suitable exemplary substituted organic thiols which can be employed to form the corresponding substituted organic disulfides include, but are not limited to, the following: 4-chloro-benzenethiol; 4-nitrobenzenethiol; 2-carboxybenzenethiol; 4-bromo-2-napthalenethiol; 2-amino-benzenethiol; thiolacetic acid; 3 - amino - 1 - propanethiol; 3-chloro-1-propanethiol; 3-nitro-1-propanethiol; etc.

As mentioned hereinabove, it is preferable to employ an organic amine catalyst when producing organic disulfides in accordance with this invention. The use of an organic amine catalyst is especially preferred when preparing aliphatic disulfides, whether acyclic or cyclic, from aliphatic thiols and dithiols. The organic amine catalyst can be a primary, secondary or tertiary amine having one, two or three organic groups which can be substituted or unsubstituted. Aliphatic amines, especially $C_4$-$C_{12}$ aliphatic amines, constitute the preferred class of organic amine catalysts for use in accordance with this invention. Suitable exemplary $C_4$-$C_{12}$ aliphatic containing amines include: n-dodecylamine, tri-n-butylamine; di-n-butylamine; tri-n-hexylamine; benzyl-dimethylamine. Other less preferable organic amine catalysts include, but are not limited to, the following: 2,6-lutidine, pyridine, N,N-dimethylaniline, diphenylamine, benzylamine etc. The ratio of organic amine catalyst to organic thiol should be sufficient to result in from about 2 to about 40 mole percent organic amine catalyst based on organic thiol. Usually, however, the mole percent of amine catalyst based on organic thiol should range from about 4 to 30%, and preferably 5 to 15%, especially when $C_4$–$C_{12}$ aliphatic amines are employed as catalysts.

Acids also have a catalytic effect on the disulfide synthesis performed according to this invention. However, the catalytic effect obtained by acids is mild compared to that secured with aliphatic amines. Suitable organic acids which can be listed as exemplary are: acetic acid; propionic acid; butyric acid; valeric acid; benzoic acid; benzene sulfonic acid; 1-butane sulfonic acid; etc.

It is preferable to employ an organic (S=O) containing compound whose end product (reduction product) has a lower boiling point than that of the organic disulfide produced. For example, when an organic sulfoxide is employed as the organic (S=O) containing compound, it is greatly preferred to use an organic sulfoxide whose monosulfide has a much lower boiling point than the organic disulfide prepared. When this process condition is observed and the organic thiol is an aliphatic thiol and the catalyst is a $C_4$–$C_{12}$ aliphatic amine; the organic disulfide synthesis constitutes a highly desirable cyclic, catalytic process. That is to say that when the preferred class of reaction products are used, the only regeneration required (except for the addition of more organic thiol) is the regeneration of the organic (S=O) containing compound. For example, when the organic thiol is 1-dodecanethiol and the organic (S=O) containing compound is dimethyl sulfoxide and the organic amine catalyst is 1-dodecylamine; the sulfoxide reduction product is dimethylsulfide (B.P. 34° C.) which has a much lower boiling point than the organic disulfide, viz., bis(n-dodecyl) disulfide (M.P. 32° C.). Consequently, the monosulfide (reduced sulfoxide) is distilled off from the reaction leaving the product and water remaining in the reactor vessel. The removed dimethyl sulfide can then be cycled to a regeneration step wherein it is converted from dimethyl sulfide back to dimethyl sulfoxide by oxidation employing a suitable oxidizing agent, e.g. $NO_2$ or a metal oxide, e.g. manganese dioxide, chromic oxide, etc. The regenerated dimethyl sulfoxide can then be recycled back to the reactor. When the organic disulfide is continuously removed as a product stream, new organic thiol can be continuously charged to the reactor. The organic amine catalyst is essentially a true catalyst since the initial amount of organic amine catalyst added does not decrease substantially regardless of the length of time over which it is used. Therefore, the only additional materials added are the organic thiol and the regenerated organic (S=O) containing compound. Hence, according to this preferred embodiment of the invention, the organic disulfide synthesis is truly a cyclic, catalytic process.

As mentioned previously, the reactions contemplated herein are usually conducted in essentially inert atmospheres especially when forming aliphatic disulfides from aliphatic thiols. Preferably, the disulfide synthesis is conducted essentially in the absence of molecular oxygen, e.g. gaseous oxygen, air (which contains gaseous oxygen), as the presence of such extraneous oxygen during reaction (1) reduces the selectivity and rate at which organic thiols are oxidized to disulfides and (2) poisons the amine catalyst. Hence, the selective oxidation of aliphatic thiols to their disulfides is preferably conducted in essentially inert atmospheres, viz., atmospheres containing little or no extraneous oxygen, e.g. nitrogen, argon, helium, etc.

In addition to the preparation of organic disulfides, this invention can be used to sweeten petroleum fractions, esp. gasoline fractions, containing reactive aromatic thiols.

The present invention will be understood in greater detail by the examples which follow. However, it should be understood that the present invention in its broadest aspects is not necessarily limited to the specific organic thiols, organic (S=O) containing compounds, catalysts, reaction temperatures and times as shown in the examples below.

Example 1.—Preparation of a typical acyclic disulfide without catalyst

Bis (n-dodecyl) disulfide was prepared by reacting 0.2 mole of 1-dodecanethiol and 0.1 mole of dimethyl sulfoxide for 19 hours at 160° C. in a nitrogen atmosphere in a glass reactor vessel at atmospheric pressure. The yield of bis (n-dodecyl) disulfide was 72 percent based on 1-dodecanethiol.

Example 2.—Preparation of a typical acyclic disulfide using various organic amines as catalysts Bis (n-dodecyl) disulfide was prepared by reacting 0.1 mole of 1-dodecanethiol and 0.2 mole of tetramethylene sulfoxide at 100° C. in a nitrogen atmosphere in a glass reactor vessel at atmospheric pressure using ten mole percent amine catalyst based on thiol in the various runs. The pseudo first order rate constants ($k$, sec.$^{-1}$) and relative reaction rates for the various catalysts are tabulated hereinbelow.

| Amine | First order rate ($k$, sec.$^{-1}$) | Relative Rate |
|---|---|---|
| None | $8.00 \times 10^{-6}$ | 1.0 |
| N,N-dimethylaniline | $1.15 \times 10^{-5}$ | 1.4 |
| 2,6-lutidine | $1.64 \times 10^{-5}$ | 2.1 |
| 1-dodecylamine | $6.42 \times 10^{-4}$ | 80.2 |
| Tri-n-butylamine | $2.04 \times 10^{-3}$ | 258.0 |

As will be observed from the above rate data, aliphatic amines are the most active catalyst under these pseudo first order reaction conditions.

Example 3.—Preparation of a typical acyclic disulfide at various temperatures with and without an aliphatic amine catalyst Bis (n-dodecyl) disulfide was prepared by reacting 0.1 mole of 1-dodecanethiol and 0.2 mole of tetramethylene sulfoxide at the temperatures listed below in a nitrogen atmosphere using a glass reactor vessel and atmospheric pressure. 1-dodecylamine was the aliphatic amine used, and the mole percent of aliphatic amine based on thiol was 10 percent. The various reaction temperatures and the corresponding reaction rates at these temperatures, with and without catalyst, are tabulated hereinbelow. It should be noted that excess sulfoxide was employed to simplify the kinetic measurements, i.e., pseudo first order reaction conditions were used.

| Catalyst | Temperature (° C.) | First Order Rates ($k$, sec.$^{-1}$) | Relative Reaction Rates |
|---|---|---|---|
| No | 100 | $7.58 \times 10^{-6}$ | 1.0 |
| Yes | 100 | $6.42 \times 10^{-4}$ | ~84 |
| No | 75 | $3.88 \times 10^{-6}$ | 1.0 |
| Yes | 75 | $2.18 \times 10^{-4}$ | ~60 |
| No | 55 | $8.63 \times 10^{-7}$ | 1.0 |
| Yes | 55 | $6.39 \times 10^{-5}$ | ~73 |

As noted from the above table, the use of an aliphatic amine catalyst allows the attainment of excellent reaction rates at lower temperatures than possible when no catalyst is used. Thus the use of an aliphatic amine catalyst results in a more economic synthesis of organic disulfides since less heat is required.

Example 4.—Preparation of a typical acyclic disulfide using a typical acid catalyst Bis (benzyl) disulfide was prepared by reacting 0.1 mole of α-toluenethiol and 0.2 mole of tetramethylene sulfoxide at 100° C. in a nitrogen atmosphere at atmospheric pressure in a glass reactor vessel using varying amounts of acetic acid as a catalyst. The mole ratio of acid catalyst to thiol and the corresponding first order rate constants for the various reactions are tabulated hereinbelow.

| Acid Catalyst/thiol (mole ratio) | First Order Rate ($k \times 10^4$, sec.$^{-1}$) |
|---|---|
| 0 | 1.96 |
| 0.10 | 2.41 |
| 0.16 | 2.77 |
| 0.32 | 4.72 |
| 0.48 | 5.13 |

The above data establishes that acetic acid is a mild catalyst in the preparation of organic disulfides to this invention. Apparently acids catalyze by protonation of sulfoxide oxygen whereas amines catalyze by increasing the amount of RS⁻ available for attack on the sulfur atom. Of course, the important fact is that both acids and bases have positive catalytic effects regardless of the theory of catalysis.

Example 5.—Preparation of various typical acyclic disulfides using various organic monothiols and various organic sulfoxides or sulfones The below indicated organic disulfides were prepared by reacting their corresponding monothiols with the various organic sulfoxides or sulfones noted below in the table. The appropriate mole amounts, set forth below in the table. The appropriate reaction temperatures, times and yields (based on thiol) are listed; and all syntheses were conducted in a nitrogen atmosphere at atmospheric pressure in closed glass reactor vessels.

Example 6.—Preparation of typical cyclic disulfides

The below indicated cyclic disulfides were prepared by reacting the given mole amounts of organic dithiols with the given amounts of the below indicated organic sulfoxides at the reaction temperatures listed. All syntheses were conducted at atmospheric pressure in a nitrogen atmosphere using glass reactor vessels. The pertinent yields and other data are tabulated hereinbelow. The listed cyclic disulfide yields are based on initial quantities of the organic dithiol.

| Organic Dithiol | Moles of Dithiol | Organic Sulfoxide | Moles of Sulfoxide | Reaction Temp. (° C.) | Reaction Time (hrs.) | Cyclic Disulfide Produced | Yield (percent) |
|---|---|---|---|---|---|---|---|
| 1,4-butane | 0.1 | Dimethyl sulfoxide | 0.1 | 130 | 18 | 1,2-dithiacyclohexane | 68 |
| Do | 0.1 | Tetramethylene sulfoxide | 0.1 | 125 | 71 | ....do.... | 89 |
| 1,3-propane | 0.1 | ....do.... | 0.1 | 125 | 17 | 1,2-dithiacyclopentane | 75 |

The cyclic disulfides produced are known, and their presence was verified by melting point and boiling point determinations and by gas chromatographic comparison to authentic samples.

Example 7.—Preparation of typical disulfides in inert solvent medium

| Organic Thiol | Moles of Thiol | Sulfoxide (moles) | Solvent (cubic centimeters) | Temperature (° C.) | Time (hrs.) | Percent Yield Disulfide |
|---|---|---|---|---|---|---|
| α-Toluene | .0031 | Dimethyl (.0031) | Toluene (20) | 100 | 72 | 50 |
| Do | .0031 | ....do.... | Cetane (20) | 100 | 70 | 72 |
| 1-dodecane | .0063 | Dimethyl (.0032) | Toluene (20) | 100 | 67 | 96 |
| α-Toluene | .0063 | ....do.... | Dimethyl formamide (20) | 100 | 66 | 60 |

Bis (tolyl) disulfide and bis (n-dodecyl) disulfide were prepared by reacting the appropriate thiol with dimethyl sulfoxide in the presence of the various solvents listed above. The reactions were performed in glass reactors by dissolving the dimethyl sulfoxide in the solvent and then adding the thiol thereto. The respective reaction temperatures, times and obtained yields of disulfides are tabulated hereinabove. The above data clearly demonstrate the feasibility of preparing both aliphatic and aromatic disulfides in inert organic solvent medium.

| Organic Monothiol | Moles of Monothiol | Organic Sulfoxide or Sulfone | Moles of Sulfoxide or Sulfone | Reaction Temp. (° C.) | Reaction time (hrs.) | Organic Disulfide Produced | Yield [a] z,z (Percent) [b] |
|---|---|---|---|---|---|---|---|
| 1-hexadecane | .05 | Dimethyl sulfoxide | .025 | 150 | 12 | Bis (n-hexadecyl) | 82 |
| Do | .25 | Diisopropyl sulfoxide | .125 | 150 | 4 | ....do.... | 36 |
| Do | .25 | Di-n-butyl sulfoxide | .125 | 150 | 5 | ....do.... | 20 |
| Do | .25 | Tetramethylene sulfoxide | .125 | 150 | 4 | ....do.... | 52 |
| Do | .05 | Dimethyl sulfoxide | .025 | 150 | 19 | Bis (n-dodecyl) | 72 |
| 1-dodecane | .05 | Dimethyl sulfoxide | .0032 | 100 | 17.5 | ....do.... | 100 |
| Do | .00625 | Tetramethylene sulfoxide | .025 | 150 | 7 | Bis (n-octadecyl) | 72 |
| 1-octadecane | .05 | Dimethyl sulfoxide | .025 | 150 | 3.5 | Bis (benzyl) | 52 |
| α-Toluene | .05 | ....do.... | .0032 | 100 | 21 | ....do.... | 100 |
| Do | .0063 | Tetramethylene sulfoxide | .0032 | 100 | 44 | ....do.... | 70 |
| Do | .0063 | Methyl phenyl sulfoxide | .025 | 150 | 19 | Bis (p-tolyl) | 82 |
| 4-methyl benzene | .05 | Dimethyl sulfoxide | .0032 | 100 | 20 | Bis (o-tolyl) | 100 |
| 2-methyl benzene | .0063 | Tetramethylene sulfoxide | .625 | 150 | 5 | Bis (phenyl) | 70 |
| Benzene | .125 | Dimethyl sulfoxide | .0014 | 25 | 20 | ....do.... | 100 |
| Do | .0028 | Tetramethylene sulfoxide | .125 | 100 | 34 | ....do.... | 65 |
| Do | .00625 | Tetramethylene sulfone | .025 | 150 | 7 | Bis (p-chlorophenyl) | 68 |
| 4-chlorobenzene | .05 | Dimethyl sulfoxide | .0125 | 150 | 6 | Bis (2-naphthalenyl) | |
| 2-naphthalene | .025 | ....do.... | | | | Bis (2-naphthyl) | 98 |
| α-Toluene | .00625 | Tetramethylene sulfone | .0125 | 100 | 22 | Bis-(benzyl) | 35 |

[a] Based on the total initial moles of thiol employed.  [b] In all cases the reaction is 100% selective to the disulfide.

The above disulfides are all known disulfides whose presence was verified by their respective melting points and boiling points, all of which are known and available in the literature. The above disulfide syntheses all involve the use of organic sulfoxides or sulfones whose reduction products (monosulfides or sulfoxides, respectively) have a lower boiling point than the disulfide prepared.

Example 8.—Effect of sulfoxide structure on rate of oxidation—no catalyst

Bis (tolyl) disulfide was prepared by reacting .0063 mole of α-toluene thiol with .0125 mole of various organic sulfoxides at 100° C. in nitrogen atmosphere using glass reactor vessels and atmospheric pressure. The varying rates of oxidation obtained using the varied types of sulfoxides are listed hereinbelow.

| Organic Sulfoxide | Type | Rate of Oxidation (k, sec.$^{-1}$) | Comparative Rate |
|---|---|---|---|
| Dimethyl sulfoxide | Alkyl | 4.10×10$^{-5}$ | 33.3 |
| Phenyl methyl sulfoxide | Alkyl-aryl | 7.76×10$^{-6}$ | 6.3 |
| Diphenyl sulfoxide | Aryl | 1.23×10$^{-6}$ | 1.0 |

The above tabulated data are typical and illustrate the comparative superiority of alkyl sulfoxides to alkyl-aryl sulfoxides and aryl sulfoxides in their ability to oxidize thiols at a rapid rate.

Example 9.—Comparative ease of uncatalyzed oxidation of various types of organic thiols The below indicated disulfides were prepared by reacting their corresponding thiols with tetramethylene sulfoxide at 55° C. in nitrogen atmosphere in glass reactor vessels. The respective rate of oxidation ($k$, sec.$^{-1}$), energy of activation (Ea, kcal./mole) and other pertinent information are tabulated hereinbelow.

| Thiol | Type of Disulfide | Oxidation Rate (k, sec.$^{-1}$) | Activation Energy, Ea (kcal./mole) | Thiol, pKa | Disulfide Produced |
|---|---|---|---|---|---|
| Benzene thiol | Aryl | 1.73×10$^{-2}$ | 4.9 | 6–7 | Bis (benzene) disulfide. |
| o-Toluene thiol (2-methyl benzene) thiol | Alkaryl | 2.65×10$^{-3}$ | 6.2 | 7–8 | Bis (o-toluene) disulfide. |
| α-Toluene thiol (phenyl methane thiol) | Aralkyl | 2.50×10$^{-5}$ | 13.7 | 10–11 | Bis (α-toluene) disulfide. |
| 1-dodecane thiol | Alkyl | 8.63×10$^{-7}$ | 19.4 | 13–14 | Bis (l-dodecyl) disulfide. |

As will be noted from the above data, the aryl and alkaryl thiols oxidize at a much faster rate than the alkyl thiol with the comparative decreasing oxidation rate order being: aryl thiols, alkaryl thiols, aralkyl thiols and alkyl thiols. These data are typical for the above listed types of organic thiols when selectively oxidized with an organic (S=O) containing compound; and aryl and alkaryl thiols are usually oxidized at a rate of 10$^3$ times faster or more than alkyl thiols when organic sulfoxides are employed to effect oxidation to the corresponding disulfides. For this reason, the use of an aliphatic amine catalyst can usually be dispensed with in the case of aryl and alkaryl thiol oxidations. This example also stresses the point that even when aliphatic thiols are present, the selective oxidation of aromatic thiols to their disulfides may well proceed preferentially compared to the selective oxidation of aliphatic thiols to their disulfides. In other words while both aromatic and aliphatic thiols are selectively oxidized to their disulfides by uses of this invention, the uncatalyzed rate of oxidation of the former is so much faster than that of the latter that for all practical purposes when no amine catalysts are present in the reaction almost all of the aromatic thiols present will be oxidized before any substantial oxidation of aliphatic thiols occurs. This discovery is put to use in selectively sweetening gasoline petroleum fractions where oxidation of aromatic thiols is not really objectionable (due to the reasonably inert nature of aromatic disulfides) but oxidation of aliphatic thiols is considered objectionable since aliphatic disulfides are more reactive and lead to the formation of objectionable color producing compounds and insoluble residues (sludge).

The organic disulfides produced according to the process of this invention are useful as additives in cosmetic products and depilatory creams.

While the foregoing examples have illustrated this invention in great detail, it should be realized that the present invention in its broadest aspects is not necessarily limited to the specific materials, temperatures, contact times, etc., as set forth therein.

What is claimed is:

1. A process for preparing organic disulfides which comprises reacting at least one organic monothiol with an organic sulfoxide at a temperature of from about 25° C. to about 150° C. and a pH of from about 4 to 14, the mole ratio of monothiol to sulfoxide being about 2:1.

2. A process according to claim 1 wherein said sulfoxide is of the formula:

where R is selected from the group consisting of alkyl, aralkyl and alkaryl.

3. A process for preparing organic disulfides which comprises contacting at least one organic monothiol with an organic sulfoxide and a catalytic amount of an organic amine at a temperature of from about 25° C. to about 150° C. and a pH of from about 4 to 14, the mole ratio of monothiol to sulfoxide being about 2:1.

4. A process for preparing acrylic organic disulfides which comprises contacting at least one organic monothiol with an organic sulfoxide and a catalytic amount of an organic amine at a temperature of from about 25° C. to about 150° C. and a pH of from about 4 to 14, the mole ratio of monothiol to sulfoxide being about 2:1.

5. A process according to claim 4 wherein said sulfoxide is a compound of the formula:

where R is selected from the group consisting of alkyl, aralkyl and alkaryl.

6. A process for preparing cyclic organic disulfides which comprises reacting an organic dithiol with an organic sulfoxide at a temperature of from about 25° C. to about 150° C. and a pH of from about 4 to 14, the mole ratio of dithiol to sulfoxide being about 1:1.

7. A process according to claim 6 wherein said sulfoxide is a compound of the formula:

where R is selected from the group consisting of alkyl, aralkyl and alkaryl.

8. A process for preparing cyclic organic disulfides which comprises contacting an organic dithiol with an organic sulfoxide and a catalytic amount of an organic amine at a temperature of from about 25° C. to about 150° C. and a pH of from about 4 to 14, the mole ratio of dithiol to sulfoxide being about 1:1.

9. A process according to claim 1 wherein the reduction product of said sulfoxide has a lower boiling point than that of said disulfide.

10. A process according to claim 1 wherein said reaction is conducted essentially in the absence of extraneous oxygen.

11. A process according to claim 4 wherein said amine is an aliphatic amine.

12. A process according to claim 11 wherein said aliphatic amine is a $C_4$ to $C_{12}$ aliphatic amine.

13. A process according to claim 4 wherein said monothiol is selected from the group consisting of aryl monothiols, aralkyl monothiols, aliphatic monothiols, and mixtures thereof.

14. A process according to claim 6 wherein said thiol is selected from the group consisting of aryl dithiols, aralkyl dithiols, aliphatic dithiols, and mixtures thereof.

15. A process according to claim 6 wherein said amine is an aliphatic amine.

16. A process according to claim 1 wherein said thiol is selected from the group consisting of aryl monothiols, aralkyl monothiols, aliphatic monothiols, and mixtures thereof.

17. A process according to claim 2 wherein said sulfoxide is selected from the group consisting of dimethyl sulfoxide and tetramethylene sulfoxide.

18. A process according to claim 4 wherein said sulfoxide is selected from the group consisting of dimethyl sulfoxide and tetramethylene sulfoxide.

19. A process according to claim 6 wherein said sulfoxide is selected from the group consisting of dimethyl sulfoxide and tetramethylene sulfoxide.

References Cited

UNITED STATES PATENTS

| 2,893,952 | 7/1959 | Chenicek | 208—204 |
|---|---|---|---|
| 3,052,626 | 9/1962 | Ferrara | 208—204 |
| 3,130,149 | 4/1964 | Hoover | 208—204 |
| 3,213,155 | 10/1965 | Schriesheim et al. | 208—204 |

DELBERT E. GANTZ, *Primary Examiner.*

R. H. SHUBERT, G. J. CRASANAKIS,
*Assistant Examiners.*